United States Patent [19]

Garrett

[11] Patent Number: 4,959,083

[45] Date of Patent: Sep. 25, 1990

[54] SEPARATION OF GAS MIXTURES

[75] Inventor: Michael E. Garrett, Woking, United Kingdom

[73] Assignee: The BOC Group plc, Windlesham, England

[21] Appl. No.: 348,547

[22] Filed: May 8, 1989

[30] Foreign Application Priority Data

May 27, 1988 [GB] United Kingdom ............... 8812642

[51] Int. Cl.⁵ .............................................. B01D 53/04
[52] U.S. Cl. ............................................. 55/26; 55/31; 55/33; 55/62; 55/68; 55/74; 55/75; 55/179; 55/387; 55/389
[58] Field of Search .................. 55/25, 26, 31, 33, 58, 55/62, 68, 74, 75, 161–163, 179, 180, 387, 389

[56] References Cited

U.S. PATENT DOCUMENTS

| | | | |
|---|---|---|---|
| 3,923,477 | 12/1975 | Armond et al. | 55/25 |
| 4,144,037 | 3/1979 | Armond et al. | 55/62 X |
| 4,190,424 | 2/1980 | Armond et al. | 55/58 |
| 4,386,945 | 6/1983 | Gardner | 55/26 |
| 4,529,412 | 7/1985 | Hayashi et al. | 55/25 |
| 4,566,881 | 1/1986 | Richter et al. | 55/62 X |
| 4,661,125 | 4/1987 | Haruna et al. | 55/62 X |
| 4,744,803 | 5/1988 | Knaebel | 55/25 |

FOREIGN PATENT DOCUMENTS

| | | | |
|---|---|---|---|
| 0302658 | 2/1989 | European Pat. Off. | 55/25 |
| 2612082 | 9/1988 | France | 55/25 |

*Primary Examiner*—Robert Spitzer
*Attorney, Agent, or Firm*—Carol A. Nemetz; David M. Rosenblum; Robert I. Pearlman

[57] ABSTRACT

A method and apparatus for the separation of air by pressure swing adsorption utilizing two beds of adsorbent material which are operated out of phase, thereby providing a more or less continuous flow of product oxygen with reduced argon content. A first adsorbent bed comprises a carbon molecular sieve which adsorbs oxygen more rapidly then nitrogen. The adsorbed oxygen is desorbed from the first bed and flows to a second bed, comprising a zeolite molecular sieve that adsorbs nitrogen preferentially to oxygen, thereby producing product oxygen as the non-adsorbed gas. Alternatively, the second bed comprises a carbon molecular sieve, and the adsorbed oxygen is desorbed as the oxygen product gas.

7 Claims, 1 Drawing Sheet

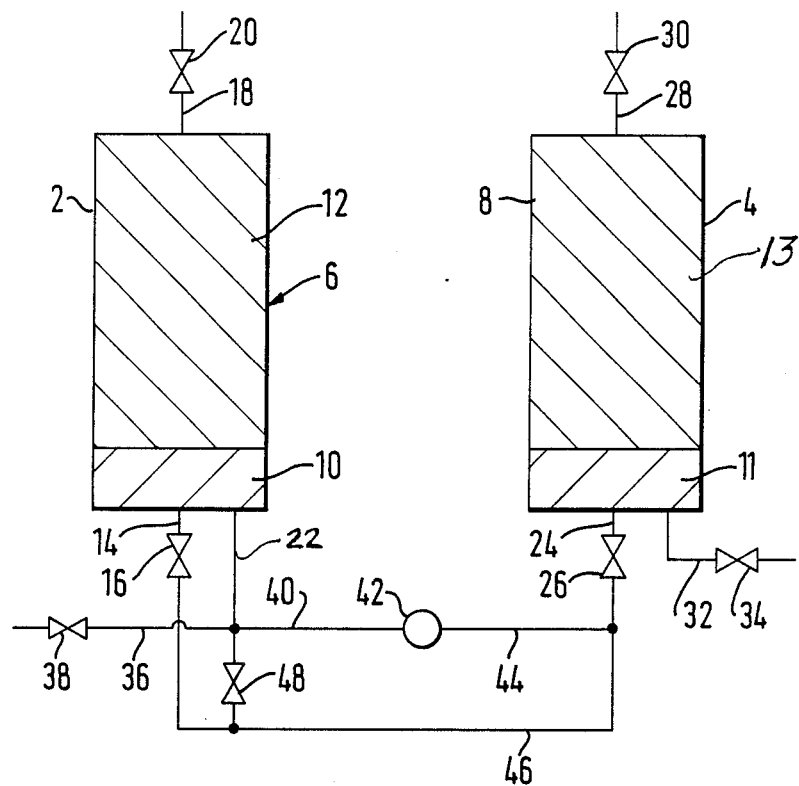

SEPARATION OF GAS MIXTURES

TECHNICAL FIELD OF THE INVENTION

This invention relates to the separation of gas mixtures, particularly air. More particularly, this invention relates to production of an oxygen stream with reduced argon content.

BACKGROUND OF THE PRIOR ART

One well known method of air separation is by pressure swing adsorption (PSA). One known PSA process for separation of oxygen from air employs a zeolite molecular sieve adsorbent which has the ability to effect a separation as between the two major components of air by virtue of its preferential adsorbtion of nitrogen. In operation, a bed of this adsorbent is put through a cycle which includes an adsorption step during which time air is pumped through the bed, some of the nitrogen and a smaller proportion of the oxygen and argon plus substantially all the carbon dioxide and water vapour in the feedstock are adsorbed, and an oxygen-rich product gas is supplied from the outlet of the bed; and a desorption step during which time the outlet of the bed is closed, the bed is vented to atmospheric pressure through its inlet and then evacuated through its inlet, so that the adsorbed gases are substantially removed from the bed thereby preparing it for the next adsorption step. Typically, but not necessarily, two or more adsorbent beds are employed and operated on similar cycles but sequenced to be out of phase with one another, so that when one bed is on its adsorption step an other bed is on its desorption step, and vice versa.

It is typically found that although a good separation can be obtained as between oxygen and nitrogen, the oxygen product is enriched in argon as compared with the original air. Indeed, in some typical PSA plants for separating oxygen from air the resulting oxygen may contain in the order of 4 to 5% by volume of argon. Occasionally, there arises a use for the oxygen in which such a level of argon is either in fact disadvantageous or perceived by some users as being disadvantageous. There is for example a demand in the field of anaesthesia for a PSA method of producing oxygen whereby a resulting product containing less than 4% by volume of argon is produced. One reason for the demand is that the closer the oxygen purity is to 100% the more closely the oxygen flow rate reading given by the oxygen flow meter on standard anaesthetic apparatus will correspond to the actual flow of molecular oxygen. It is an aim of the present invention to meet this need.

SUMMARY OF THE INVENTION

According to the present invention there is provided a method of separating oxygen from air comprising repeatedly performing the following sequence of steps :
  (a) passing compressed air into a first bed of adsorbent that adsorbs oxygen more rapidly than nitrogen and argon, and discharging from the first bed unadsorbed gas comprising nitrogen and a part of the argon content of the compressed air,
  (b) stopping the passage of compressed air into the first bed;
  (c) reducing the pressure to which the first bed is subjected thereby to cause desorption of the adsorbed gas, and causing desorbed gas to flow out of the first bed;
  (d) recompressing at least some of said desorbed gas;
  (e) passing the recompressed gas into a second bed of adsorbent that is able to effect separation as between nitrogen and oxygen; and
  (f) withdrawing product oxygen from said second bed, and regenerating said second bed by desorbing gas therefrom and causing desorbed gas to flow out of the second bed.

The first bed preferably comprises carbon molecular sieve that adsorbs oxygen more rapidly than nitrogen. The second bed preferably comprises zeolite molecular sieve that adsorbs nitrogen preferentially to oxygen. Accordingly, in this example of the invention, the oxygen product is the unadsorbed gas that flows out of the second bed. It is however possible to employ a second bed comprising carbon molecular sieve that adsorbs oxygen more rapidly than nitrogen and to take the desorbed gas as the oxygen product gas.

Desorption of the adsorbed gas from the first bed is preferably initiated by placing the first bed in communication with the second bed so as to equalize the pressure therebetween or to reduce the pressure difference therebetween. Once this has been done, the inlet to a compressor is placed in communication with the bottom of the first bed and its outlet is placed in communication with the bottom of the second bed so that the pressure in the second bed can be raised to higher value than that in the first bed. Preferably, the same compressor is used in sequence to compress the air and to compress the gas flowing from the first bed to the second bed.

The invention also provides apparatus to perform the method according to the invention.

Preferred examples of the method according to the invention are able to produce an oxygen product containing up to 3% by volume of argon. Since in anaesthesia the typical practice is to dilute the oxygen with the anaesthetic such that the resulting mixture contains 35% by volume of oxygen or less, the argon content of the gas mixture will be at substantially the same level as in air when the oxygen is produced by the method according to the invention.

BRIEF DESCRIPTION OF THE DRAWING

The method and apparatus according to the present invention will now be described by way of example with reference to the accompanying drawing, FIG. 1, which is a schematic flow diagram of one apparatus for performing the method according to the invention.

DETAILED DESCRIPTION OF THE INVENTION

Referring to the drawing, the apparatus includes first and second cylindrical vessels 2 and 4 that are substantially identical to one another and contain respectively beds 6 and 8 of molecular sieve adsorbent. The bed 6 comprises a lower layer 10 of desiccant and an upper layer 12 of carbon molecular sieve that adsorbs oxygen more rapidly than nitrogen and argon. The layer 12 occupies more than three quarters of the volume of the vessel 6. The bed 8 comprises a lower layer of desiccant 11 and an upper layer 13 of zeolite molecular sieve that adsorbs nitrogen preferentially to oxygen and argon.

The vessel 2 has an inlet 14 at its bottom provided with an automatically operable on-off valve 16 disposed therein. In addition, there is an outlet 18 at its top provided with automatically operable on-off valve 20 disposed therein, and an outlet 22 at its bottom. The vessel 4 has an inlet 24 at its bottom with an automatically operable on-off valve 26 disposed therein; also, there is an outlet 28 at its top with an automatic operable on-off valve 30 disposed therein, and an outlet 32 at its bottom which has an automatically operable on-off valve 34 disposed therein. In addition, the apparatus includes a gas distribution system including a main air inlet 36 having an automatically operable on-off valve 38 disposed therein. The inlet 36 terminates in the union of a conduit 40 with the outlet 22 from the vessel 2. The conduit 40 terminates in the inlet of a compressor 42. The outlet of the gas compressor 42 terminates in the inlet of another conduit 44 whose outlet terminates in the union of the inlet 24 to the vessel 4 and a two-way gas passage 46. The two-way gas passage 46 extends from its union with the inlet 24 to the union between the inlet of the conduit 40 and the outlet 22 at the bottom of the vessel 2, and the inlet 14 terminates in the passage 46. There is an automatically operable on-off valve 48 disposed in a region of the passage 46 intermediate its union with the inlet 14 and its union with the outlet 22.

In operation, the apparatus shown in the drawing performs the following cycle of steps:
1. Pressurisation of bed 2 with air;
2. Discharge of unadsorbed gas from bed 2 through the outlet 18;
3. The pressure equalisation between the beds 6 and 8;
4. Pressurisation of bed 8 with gas from bed 6;
5. Delivery of product gas from bed 8;
6. Regeneration of bed 8.

Preferably, step 6 of the above cycle is performed simultaneously with steps 1 and 2. If this practice is adopted, the table below sets out the positions of the on-off valves during the cycle:

|        | VALVE |    |    |    |    |    |    |
|--------|-------|----|----|----|----|----|----|
|        | 16    | 20 | 26 | 30 | 34 | 38 | 48 |
| Step 1 | O     | S  | S  | S  | O  | O  | S  |
| Step 2 | O     | O  | S  | S  | O  | O  | S  |
| Step 3 | S     | S  | O  | S  | S  | S  | O  |
| Step 4 | S     | S  | O  | S  | S  | S  | S  |
| Step 5 | S     | S  | O  | O  | S  | S  | S  |

S = Shut
O = Open

During the first step of the process, incoming air is compressed to a pressure to be in the range of 2 to 10 atmospheres absolute (preferably in the range 4 to 6 atmospheres absolute) and the resulting compressed air flows from the outlet of the compressor 42 through the passages 44 and 46 and then into the bed 6 via the inlet 14. The lower desiccant layer 10 is effective to adsorb water vapour from the air. The water-depleted air then passes into the layer 12 and the carbon molecular sieve is effective to adsorb carbon dioxide and oxygen at rates more rapid than the rates at which nitrogen and argon are adsorbed. In practice, a proportion of the argon but only a relatively small amount of the nitrogen content of the incoming air is adsorbed by the carbon molecular sieve. Once the pressure of the bed has reached that of the outlet of the compressor 42, the valve 20 is opened and thus step 2 of the cycle starts.

During the second step of the cycle, there is passage of air into the bed 6 to maintain the pressure therein while the unadsorbed gas flows out of the top of the vessel 2 through the outlet 18 and is vented to the atmosphere. The unadsorbed gas comprises nitrogen and part of the argon in the incoming air. When the carbon molecular sieve in layer 12 has adsorbed so much oxygen that the oxygen concentration in the vent gas is about to increase undesirably, the cycle moves onto step 3.

During step 3, the compressor 42 is put on a stand-by mode and gas from the vessel 2 flows into the bed 8 via the outlet 22 from the vessel 2, the passage 46 through valve 48 and then the inlet 24 through valve 26 to the vessel 4. The gas that flows into the vessel 4 comprises not only unadsorbed gas remaining in vessel 2 at the end of step 2 of the cycle, but also gas that is desorbed in vessel 2 as the pressure therein progressively falls.

Accordingly, the gas entering the bed 8 in the vessel 4 will include all the constituents of the incoming air 36, but its nitrogen and argon content will be less than that of the incoming air. During step 3 of the cycle, as the pressure in the bed 8 progressively increases so the zeolite molecular sieve preferentially adsorbs nitrogen, water vapour and carbon dioxide being preadsorbed by the desiccant layer 11. Some of the argon is also adsorbed by the zeolite. Thus, the unadsorbed gas becomes enriched in oxygen.

Once the pressure in the two beds is equalized, step 4 of the cycle starts and for this step the compressor is employed to create a flow of gas from the vessel 2 to the vessel 4 and thus the pressure in the vessel 2 is reduced again to atmospheric pressure. Normally step 4 is a step of relatively short duration and if desired the valve 30 may open simultaneously with the closing of the valve 48 at the end of step 3 such that step 4 of the process is omitted altogether. Once the pressure in the two vessels 2, 4 has been equalized, the cycle moves immediately to step 5 with oxygen product being withdrawn from the top of the vessel 4 through the outlet 30. Step 5 of the process typically ends once the pressure in the vessel 4 has fallen to about atmospheric pressure. The cycle of operations is then repeated with the bed 8 being regenerated during steps 1 and 2 by keeping the valve 34 open to allow previously adsorbed gas to be desorbed and vented to the atmosphere.

The vessels 2 and 4 may be of any convenient size but is generally desired that the apparatus be capable of delivering product gas at an average rate in the range of 1 to 10 liters per minute. Typically, the outlet 28 terminates in a reservoir (not shown) from which product gas may be withdrawn at a constant rate throughout the cycle. This makes possible continuous production of product oxygen gas.

What is claimed is:
1. A method of separating oxygen from air comprising repeatedly performing the following sequence of steps:
(a) passing compressed air into a first bed of adsorbent that adsorbs oxygen more rapidly than nitrogen and argon, and discharging from the first bed unadsorbed gas comprising nitrogen and a part of the argon content of the compressed air;
(b) stopping the passage of the compressed air into the first bed;
(c) placing the first bed in communication with a second bed of adsorbent that is able to effect a separation as between nitrogen and oxygen and having a lower initial pressure than the first bed so that the pressures in the first and second beds tend toward equalization to initiate desorption of adsorbed oxygen in the first bed with the decrease in pressure therein, to cause a gas mixture to flow from the first bed to the second bed, the gas mixture including two major components comprising the desorbed oxygen and nitrogen present in the unadsorbed gas remaining in the first bed after passage of the compressed air thereto is stopped, and to initiate adsorption of one of the major components in the second bed with the increase in pressure therein;

(d) recompressing at least some of the gas mixture;

(e) passing the recompressed gas mixture into the second bed to raise the pressure in the second bed to a higher value than that of the first bed; and (f) producing product oxygen from the second bed via withdrawing gas not adsorbed in the second bed, and then regenerating said second bed by desorbing gas therefrom and causing the desorbed gas to flow out of the second bed.

2. A method according to claim 1, wherein the first bed comprises carbon molecular sieve.

3. A method according to claim 2, wherein the first bed includes a lower layer of desiccant.

4. A method according to claim 1, wherein the second bed comprises zeolite molecular sieve that adsorbs nitrogen preferentially to oxygen, the unadsorbed gas that flows out of the second bed being the product oxygen.

5. A method according to claim 1, in which the second bed comprises carbon molecular sieve that adsorbs oxygen more rapidly than nitrogen, the oxygen product gas being said desorbed gas.

6. A method according to claim 1, wherein the same compressor is used in sequence to compress the air and to compress the gas flowing from the first bed to second bed.

7. Apparatus for separating oxygen from air comprising a first vessel having a first valve for venting nitrogen and argon and containing a first bed comprising a lower layer of desiccant and an upper layer of carbon molecular sieve, and a second vessel having a second valve for venting oxygen and containing a second bed comprising a lower layer of desiccant and an upper layer of zeolite molecular sieve, wherein the first and second beds are in communication via compressor means for pressurizing the first bed with air so that oxygen is adsorbed therein, while the nitrogen and argon is vented from the first valve, thereafter, for connecting the first and second beds to one another so that desorption of oxygen from the first bed is initiated with the drop in pressure therein and the desorbed oxygen together with the nitrogen and argon, not adsorbed in nor vented from the first bed, flows to the second bed wherein adsorption of the nitrogen is initiated with the increase in pressure therein, and, thereafter, for pressurizing the second bed with the unadsorbed and unvented nitrogen and argon and desorbed oxygen, after the pressure in the first bed has fallen to a chosen value, to a value higher than that of the second bed so that the nitrogen adsorbs in the second bed and the desorbed oxygen can be withdrawn through the second valve as product.

* * * * *